United States Patent
Tran et al.

(10) Patent No.: US 7,108,800 B2
(45) Date of Patent: Sep. 19, 2006

(54) METHOD FOR PREVENTING THE AGGLOMERATION OR GENERATION OF DUST FROM A PARTICULATE MATERIAL COMPRISING COAL

(75) Inventors: Bo L. Tran, Chicago, IL (US); Sankar Bhattacharja, Niles, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 10/846,218

(22) Filed: May 14, 2004

(65) Prior Publication Data
US 2005/0253108 A1    Nov. 17, 2005

(51) Int. Cl.
*C09K 3/18* (2006.01)
*B05D 5/08* (2006.01)

(52) U.S. Cl. ............ 252/70; 252/88.1; 241/16; 44/601; 44/602; 44/620

(58) Field of Classification Search ........ 252/70, 252/73, 74, 79, 88.1; 241/16; 44/601, 602, 44/620
See application file for complete search history.

(56) References Cited

U.S. PATENT DOCUMENTS

| | | | |
|---|---|---|---|
| 4,417,992 A | | 11/1983 | Bhattacharyya et al. |
| 4,426,409 A | * | 1/1984 | Roe ................ 44/601 |
| 4,594,268 A | | 6/1986 | Kirwin |
| 4,689,251 A | | 8/1987 | Newman et al. |
| 5,079,036 A | * | 1/1992 | Roe et al. ............ 427/212 |
| 5,104,711 A | | 4/1992 | Marsek |
| 5,188,750 A | * | 2/1993 | Kogure et al. ............ 252/70 |
| 5,194,174 A | | 3/1993 | Roe et al. |
| 5,439,608 A | | 8/1995 | Kondrats |
| 6,039,890 A | * | 3/2000 | Ossian et al. .......... 252/70 |
| 6,294,104 B1 | * | 9/2001 | Ilves et al. ............ 252/70 |
| 6,491,736 B1 | | 12/2002 | Bell et al. |
| 6,589,442 B1 | | 7/2003 | Wilson et al. |
| 6,890,451 B1 | * | 5/2005 | Sapienza et al. .......... 252/70 |
| 2001/0023653 A1 | | 9/2001 | Langford |
| 2002/0184933 A1 | | 12/2002 | Bell, III et al. |
| 2005/0087720 A1 | * | 4/2005 | Samuels et al. ............ 252/70 |

FOREIGN PATENT DOCUMENTS

| | | |
|---|---|---|
| EP | 0 195 638 B1 | 6/1991 |
| JP | 1979-143200 | 11/1979 |
| JP | 1980-175511 | 12/1980 |
| JP | 1983-229818 | 12/1983 |
| JP | 1991-145438 | 5/1991 |
| PL | 1978-207054 | 5/1978 |
| PL | 1987-268863 | 11/1987 |
| WO | WO 00/34200 | 6/2000 |
| WO | WO 02/098814 A1 | 12/2002 |

OTHER PUBLICATIONS

Hawley's Condensed Chemical Dictionary, 13th Edition, Revised by Richard J. Lewis, Sr., © 1997, p. 543 definition of glycerol.
CEH Product Review of Glycerin, Feb. 2003, by Elvira O. Camara Greiner with Ralf Gubler and Kazuo Yagi, © 2003 by the Chemical Economics Handbook—SRI International.
Hawley's Condensed Chemical Dictionary, 13th Edition, Revised by Richard J. Lewis, Sr., © 1997, p. 543 definition of glycerol.
CEH Product review of Glycerin, Feb. 2003, by Elvira O. Camara Greiner with Ralf Gubler and Kazuo Yagi, © 2003 by the Chemical Economics Handbook-SRI International.

* cited by examiner

*Primary Examiner*—Lorna M. Douyon
*Assistant Examiner*—Amina Khan
(74) *Attorney, Agent, or Firm*—Michael B. Martin; Thomas M. Breininger

(57) ABSTRACT

A method of preventing the generation of dust or agglomeration of particulate material comprising coal by applying to the particulate material a mixture of from about 45 to about 90 weight percent of glycerin, from about 5 to about 50 weight percent of water, about 0.5 to about 3 weight percent of fatty acids and esters thereof and from 2 to about 15 weight percent of water soluble salts, which has been diluted with about 10–400 weight percent of water. The diluted composition is applied in an affective amount to suppress agglomeration of particulate material and its adhesion to surfaces and to substantially prevent the generation of dust. The concentrated composition has a freezing point of at least −35° C.

10 Claims, No Drawings

METHOD FOR PREVENTING THE AGGLOMERATION OR GENERATION OF DUST FROM A PARTICULATE MATERIAL COMPRISING COAL

FIELD OF THE INVENTION

This present invention relates to a concentrated product found to be useful for dust control and freeze control. This concentrated product may be applied on surfaces containing particles or particulate matter.

BACKGROUND OF THE INVENTION

Dust from traffic on dirt roads and from the handling of bulk products with attendant particulate materials can create significant health, environmental and safety problems. In mining facilities, industrial sites and construction sites, the operations may be significantly restricted by dust cloud formation. Also, health, environmental and safety problems may arise when any kind of dust is inhaled.

Known dust controlling agents include oils, paper making byproducts such as lignosulfonate dispersions, and water, optionally containing various salts such as magnesium and calcium chloride, or sodium chloride. Also, as described in U.S. Pat. No. 6,589,442, a partially saponified mixture of crude tall oil and vegetable oil, emulsified in water, may be used as a dust control agent.

However, further problems arise in dust control when the temperature drops well below freezing. During cold winters, the dust problems can persist even in subfreezing temperatures, particularly in operations such as coal mining. Also, even without dust problems, freshly mined coal may carry a significant amount of moisture, which can freeze. The freezing of the moisture on the surface of the coal and in the coal causes the chunks of coal to agglomerate into large, unwieldy lumps. Also, in cold weather, this moisture may cause lumps of coal to freeze to the metal walls of hopper cars and railroad cars that are used to transport the coal, which causes problems of materials handling. The same can apply to other divided materials, and, dust can be generated from the handling of such coal, as well as from the handling of other particulate products such as sand, at any temperature.

It would be desirable to identify an economical and highly-effective agent that provides freeze control to prevent agglomeration and bonding of moist, particulate materials even at very low temperatures on the order of about −20° C. and below, while also providing dust control at any temperature.

SUMMARY OF THE INVENTION

The first aspect of the instant claimed invention is a concentrated product for dust control and freeze control, wherein said concentrated product comprises a mixture of from about 45 to about 90 weight percent of glycerin, from about 5 to about 50 weight percent of water and from about 2 to about 15 weight percent of a water soluble salt, and wherein the freezing point of said concentrated product is about −35° C.

The second aspect of the instant claimed invention is a concentrated product for dust control and freeze control comprising a crude glycerin solution, wherein said crude glycerin solution comprises glycerin, water and a water soluble salt, and wherein said crude glycerin solution is derived from vegetable oils or is formed as a byproduct from a biodiesel manufacturing process of forming fatty acid esters from vegetable oils, and wherein the freezing point of said concentrated product is about −35° C.

The third aspect of the instant claimed invention is a method of preventing the agglomeration of particulate material and the adhesion thereof to surfaces in subfreezing temperatures, which comprises
applying an effective amount of a concentrated product for freeze control, wherein said concentrated product comprises a mixture of from about 45 to about 90 weight percent of glycerin, from about 5 to about 50 weight percent of water and from about 2 to about 15 weight percent of a water soluble salt; and
wherein an effective amount is that amount of concentrated product sufficient to wet the surface of the particulate material and to substantially prevent freezing thereof at the temperature of use, to suppress agglomeration of the particulate material and its adhesion to surfaces,
and
wherein the freezing point of said concentrated product is about −35° C.

The fourth aspect of the instant claimed invention is a method of preventing the generation of dust from particulate materials, which comprises:
applying to said particulate material a concentrated product for dust control,
wherein said concentrated product comprises a mixture of from about 45 to about 90 weight percent of glycerin, from about 5 to about 50 weight percent of water and from about 2 to about 15 weight percent of a water soluble salt; and
wherein an effective amount is that amount of concentrated product sufficient to wet the surface of the particulate material and to substantially prevent the generation of dust from said particulate material,
and
wherein the freezing point of said concentrated product is about −35° C.

DESCRIPTION OF THE INVENTION

By this invention, a new, inexpensive, environmentally safe, long lasting dust control and freeze control agent is provided, which can be used at essentially any temperature, but is particularly advantageous over other agents at subfreezing temperatures, for control of dust from dirt roads, as well as from piles of particulate materials, while being capable of preventing freeze agglomeration and freeze adhesion of wet, particulate materials.

The first aspect of the instant claimed invention is a concentrated product for dust control and freeze control, which concentrated product comprises a mixture of about 45 to about 90 weight percent of glycerin and about 5 to about 50 weight percent of water and about 2 to about 15 weight percent of a water soluble salt, such as sodium or potassium chloride, and
wherein the freezing point of said concentrated product is about −35° C.

Glycerin is a commercial product available from chemical supply companies.

Any source of water, including tap water and raw water, may be used to supply the water required for the concentrated product.

Concerning the requirement that there be included a water soluble salt, it has been found that if desired, calcium chloride may also be added along with, or as a substitute for, the sodium or potassium chloride. Other inorganic and organic salts may also be used. These inorganic and organic salts are known to people of ordinary skill in the art of formulation chemistry.

This concentrated product may also contain trace amounts of other ingredients such as, but not limited to, free fatty acids and esters thereof and methanol. It is believed that these trace amounts of other ingredients do not enhance or detract from the dust control properties of the concentrated product. It is believed that these trace amounts of other ingredients do not enhance or detract from the freeze protection characteristics of the concentrated product. Therefore, these trace materials are tolerable in the concentrated product, provided all of them together make up no more than about 5 weight percent of the concentrated product.

The instant claimed invention is a concentrated product for dust control and freeze control, which comprises a mixture of about 45 to about 90 weight percent of glycerin and about 5 to about 50 weight percent of water and about 2 to about 15 weight percent of a water soluble salt. The preferred composition of this concentrated product is from about 50 to about 90 weight percent glycerin, from about 5 to about 45 weight percent water and from about 3 to about 10 weight percent water soluble salt. A more preferred composition of this concentrated product is from about 60 to about 90 weight percent glycerin, from about 5 to about 38 weight percent water and from about 4 to about 10 weight percent water soluble salt.

A second aspect of the instant claimed invention is a concentrated product for dust control and freeze control comprising a crude glycerin solution, wherein said crude glycerin solution comprises glycerin, water and a water soluble salt, and wherein said crude glycerin solution is derived from vegetable oils or is formed as a byproduct from a biodiesel manufacturing process of forming fatty acid esters from vegetable oils, and wherein the freezing point of said concentrated product is about −35° C.

Crude glycerin may be derived from vegetable oils, either during manufacturing or by using recycled vegetable oils as a source material. One such derivation is the formation of crude glycerin from a manufacturing process for making fatty acid esters from at least one oil selected from the group consisting of soybean oil and canola oil. Another derivation uses recycled vegetable oils from fast food restaurants as a source material for the crude glycerin. Other methods of deriving crude glycerin from vegetable oils are known to people of ordinary skill in the art of glycerin. It is preferred to use crude glycerin derived from vegetable oils that are obtained from oil seeds.

Crude glycerin may also be formed as a byproduct from a biodiesel manufacturing process for forming fatty acid esters from vegetable oils, preferably ethyl and methyl esters of particularly soybean oil and canola oil. However, other oils may be used. Biodiesel concentrated production processes are well known. There are three basic routes to biodiesel concentrated production from fat-containing oils from living things, particularly oilseeds, namely (1) base catalyzed transesterification of the oil; (2) direct acid catalyzed transesterification of the oil; (3) conversion of the oil to its fatty acids, and then to biodiesel.

Most of the biodiesel produced today is conventionally done with the base catalyzed reaction, because of its high conversion of fatty acids directly to the ester form with minimal side reactions and reaction time. For example, 100 pounds of vegetable oil comprising fatty acid triglycerides may be reacted with an appropriate amount of ethyl or methyl alcohol, for example 10 pounds, to yield about 10 pounds of glycerin and about 100 pounds of biodiesel quality fatty acid methyl or ethyl ester. Of course, variation in the proportions and types of ingredients may be used.

The base used for the reaction is typically sodium hydroxide or potassium hydroxide, being dispersed in the alcohol used (typically ethanol or methanol), with standard agitation or mixing. The alcohol/base mix may then be charged into a closed reaction vessel, and the vegetable oil is added. The system is then closed, and held at about 71° C. (160° F.) for a period of about 1 to 8 hours, although some systems recommend that the reaction take place at room temperature. An excess of alcohol is normally used to insure almost total fat/oil conversion to ester form.

Once the reaction is complete, two major products have been formed: crude glycerin and biodiesel fatty acid esters. Excess alcohol may be recovered by distillation or another conventional manner, and the crude glycerin can generally be drawn off the bottom of a settling vessel. The crude glycerin is on the alkali side because of the presence of the sodium or potassium hydroxide. It is preferably neutralized with an acid such as hydrochloric acid, thus forming a inorganic salt in the glycerin.

It is this crude glycerin which is the concentrated product of the second aspect of the instant claimed invention. The crude glycerin byproduct is quite inexpensive, much cheaper than the pure glycerin that can be refined from it, so the material used in this invention is an economical dust control and freeze control agent, which remains useable at very low temperatures, and is highly effective for settling dust.

The concentrated product comprising crude glycerin derived from vegetable oils or from biodiesel processes typically comprises from about 78 to 84 weight percent glycerin, from about 7 to about 16 weight percent water and from about 6 to about 9 weight percent inorganic salts. The crude glycerin also may contain trace amounts of materials without a detrimental effect upon its efficacy as either a dust control agent or as a freeze conditioning agent. These trace amounts of materials typically are from about 0.5 to about 2 weight percent methanol, fatty acids and esters thereof.

The third aspect of the instant claimed invention is a method of preventing the agglomeration of particulate material and the adhesion thereof to surfaces in subfreezing temperatures, which comprises: applying to said particulate material an effective amount of a concentrated product, which concentrated product comprises a mixture of glycerin, water and a water soluble salt; wherein the effective amount is that amount sufficient to wet the surface of the particulate material so as to substantially prevent freezing thereof at the temperature of use and to suppress agglomeration of the particulate material and its adhesion to surfaces, and wherein the freezing point of said concentrated product is about −35° C.

The third aspect of the instant claimed invention relates to a method of preventing the agglomeration of particulate materials, such as coal, iron ore, bauxite, wood chips and the like. Coal is considered a "particulate", even though the majority of the coal may be found in rather large chunks. Metal surfaces are particularly vulnerable to such adhesion by lumps of coal or other particulate minerals under very cold conditions, because of the high heat transfer properties of metal, and because coal and certain other particulate minerals are transported in metal rolling hoppers and railroad cars.

An advantage of the concentrated product of this invention arises from the inclusion of an aqueous glycerin mixture, which is known to have a depressed freezing point, plus the presence of a water soluble salt such as sodium chloride, which provides unexpectedly great additional freezing point depression when compared with pure glycerin and water, so that the concentrated product, even when diluted with additional water, is easily used at subfreezing temperatures.

For example, it is known that a 50% water solution of pure glycerin begins to freeze at a temperature at least about −25° C. (−13° F.) with freezing definitely taking place at a temperature of at least about −29° C. (−20° F.). In contrast, the concentrated product of the instant claimed invention, comprising about 50% weight percent glycerin, has been found to not begin freezing until the temperature reaches at least about −35° C. (about −31° F.), with freezing definitely taking place at a temperature of at least about −40° C. (about −40° F.).

This freezing point can be further lowered by increasing the amount of water soluble salt, such as sodium chloride to a level of about 10 weight percent in the concentrated product.

Thus, the concentrated product may also be used even under harsh winter conditions as an anti-agglomerating and anti-adhesion agent, without encountering problems that result from freezing of the concentrated product.

The concentrated product of this invention is available from Nalco Company, 1601 W. Diehl Road, Naperville, Il 60563, (630) 305-1423.

The concentrated product may optionally be diluted with water to reduce the cost per square meter of surface being treated. The amount of water dilution may vary with the conditions, and may be determined at the site of use, depending upon the nature of the particulate matter, be it dirt roads, coal piles, sand piles, or the like, and the temperature at the area. The typical dilution is from about 10 to about 400 weight percent of water, based on the amount of the concentrated product present. This diluted mixture may then be applied to a road, a pile of coal, such as coal in a railroad car or rolling hopper, a pile of sand, or the like, to reduce the propagation of dust. This concentrated product also will act to prevent particle agglomeration at low temperatures.

It is typically preferred for the concentrated product of this invention to contain, as applied from about 40 to about 60 weight percent of glycerin when its use is for freeze control, that is: prevention of agglomeration of material particles including chunks, and prevention of their adhesion to particularly metal surfaces of railcars and the like, even if the prevention of dust in the air is not a major factor.

The effective amount is that amount of concentrated product sufficient to wet the surface of the particulate material and to substantially prevent freezing thereof at the temperature of use, to suppress agglomeration of the particulate material and its adhesion to surfaces.

As previously stated, the concentrated product is particularly useful at subfreezing temperatures, because it does not freeze until at least about −35° C. is reached, and thereby serves as a freeze control agent to prevent the agglomeration of particulate matter like coal, and the sticking thereof to particularly metal surfaces such as railroad cars, because of freezing of water present in the particulate concentrated product.

The fourth aspect of the instant claimed invention is a method of preventing the generation of dust from particulate materials, which comprises: applying to said particulate material a concentrated product for dust control, which concentrated product comprises an effective mixture of glycerin, water and water soluble salt, in concentrations sufficient to wet the surface of the particulate material and to substantially prevent the generation of dust from said particulate material, and wherein the freezing point of said concentrated product is about −35° C.

The concentrated product useful in the fourth aspect of the instant claimed invention is that concentrated product of either the first aspect of the instant claimed invention or that concentrated product of the second aspect of the instant claimed invention.

It has been found that the concentrated product of this invention is highly effective for dust control, showing improvements in its own right over many other dust control agents at any temperature to suppress the generation of dust in the surrounding air.

When dust suppression is a major factor, it is generally preferred for the concentrated product of this invention, to contain, as applied, on the order of from about 20 to 80 weight percent of glycerin.

The following examples are presented to describe preferred embodiments and utilities of the invention and are not meant to limit the invention unless otherwise stated in the claims appended hereto.

EXAMPLES

Example 1

Dust Control

A crude glycerin solution is obtained from a biodiesel synthesis process using soybean oil or canola oil as a raw material, with methanol and sodium hydroxide as added reactants, under conventional, commercial conditions. The resulting crude glycerin component is separated in a conventional manner, and neutralized with hydrochloric acid. In this embodiment, the crude glycerin component comprises about 80 weight percent of glycerin, about 10 to about 11 weight percent of water, about 7 weight percent of sodium chloride, and about 1 to about 2 weight percent of fatty acids and methyl esters thereof.

This concentrated product is applied to a dirt road located in a sand and gravel processing facility to act as a dust control material. The first application is applied as a mixture of about 70 weight percent concentrated product and about 30 weight percent water. Four weeks later, a "maintenance dose" of a mixture of about 20 weight percent concentrated product and about 80 weight percent water is applied to maintain the desired level of dust control. The level of dust control achieved is considered acceptable and the customer places a large order for concentrated product for use as a dust control agent on this dirt road.

Example 2

Freeze Control

The operators of a power plant wish to not receive coal that is frozen together in agglomerated clumps that are difficult to unload and must be broken up prior to being used as fuel for the power plant boilers.

The coal travels in open rail cars from the coal processing plant to the power plant and during winter months under subfreezing temperatures it has been known for coal to arrive within a week to two weeks in a frozen state, causing handling to be very difficult.

During the month of December of 2003, the crude glycerin solution of Example 1 is applied to coal in open rail cars using a spray nozzle that applies the crude glycerin solution as the coal comes off the conveyor belt and lands in the rail car. The material as applied comprises from about 60 to about 65 weight percent crude glycerin and from about 35 to about 40 weight percent water. A dosing level of from about two to about four pints of material as applied is used per ton of coal.

The power plant immediately notices a lessening in their receipt of frozen together or "agglomerated" coal and requests that throughout the winter months this material be applied on a regular basis.

The above has been offered for illustrative purposes only, and is not intended to limit the scope of the invention of this application, which is as defined in the claims below.

The invention claimed is:

1. A method of preventing the agglomeration of a particulate material comprising coal and the adhesion thereof to surfaces in subfreezing temperatures comprising
    a) providing a particulate material comprising coal;
    b) providing a concentrated product which comprises a mixture of from about 45 to about 90 weight percent of glycerin, from about 5 to about 50 weight percent of water, about 0.5 to about 3 weight percent of fatty acids and esters thereof and from about 2 to about 15 weight percent of water soluble salts wherein the freezing point of said concentrated product is at least about −35° C.;
    c) diluting the concentrated product with about 10–400 weight percent of water, based on the amount of said concentrated product to form a diluted product;
    d) applying to the particulate material an amount of the dilute product effective to suppress agglomeration of the particulate material and its adhesion to surfaces.

2. The method of claim 1 wherein wherein said concentrated product comprises a crude glycerin solution derived from vegetable oils or is formed as a byproduct from a biodiesel manufacturing process of forming fatty acid esters from vegetable oils.

3. The method of claim 2 wherein said salt comprises sodium chloride.

4. The method of claim 2 wherein said salt comprises calcium chloride.

5. The method of claim 2 wherein said concentrated product is formed from a manufacturing process for making fatty acid esters from at least one oil selected from the group consisting of soybean oil and canola oil and wherein said concentrated product comprises from about 78 to 84 weight percent glycerin, from about 7 to about 16 weight percent water and from about 6 to about 9 weight percent inorganic salts.

6. A method of preventing the generation of dust from particulate materials comprising coal comprising
    a) providing a particulate material comprising coal;
    b) providing a concentrated product which comprises a mixture of from about 45 to about 90 weight percent of glycerin, from about 5 to about 50 weight percent of water, about 0.5 to about 3 weight percent of fatty acids and esters thereof and from about 2 to about 15 weight percent of water soluble salts wherein the freezing point of said concentrated product is at least about −35° C.;
    c) diluting the concentrated product with about 10–400 weight percent of water, based on the amount of said concentrated product to form a diluted product; and
    d) applying to the particulate material an amount of the dilute product effective to wet the surface of the material and substantially prevent the generation of dust from the particulate material.

7. The method of claim 6 wherein wherein said concentrated product comprises a crude glycerin solution derived from vegetable oils or is formed as a byproduct from a biodiesel manufacturing process of forming fatty acid esters from vegetable oils.

8. The method of claim 7 wherein said salt comprises sodium chloride.

9. The method of claim 7 wherein said salt comprises calcium chloride.

10. The method of claim 7 wherein said concentrated product is formed from a manufacturing process for making fatty acid esters from at least one oil selected from the group consisting of soybean oil and canola oil and wherein said concentrated product comprises from about 78 to 84 weight percent glycerin, from about 7 to about 16 weight percent water and from about 6 to about 9 weight percent inorganic salts.

* * * * *